F. WEHINGER.
WIRE CLICK SPRING AND FASTENING RIVET THEREFOR.
APPLICATION FILED SEPT. 6, 1917.

1,254,747.

Patented Jan. 29, 1918.

Inventor
Frederick Wehinger
by Seymour & Earle
Attys

UNITED STATES PATENT OFFICE.

FREDERICK WEHINGER, OF WATERBURY, CONNECTICUT, ASSIGNOR TO WATERBURY CLOCK CO., OF WATERBURY, CONNECTICUT, A CORPORATION.

WIRE CLICK-SPRING AND FASTENING-RIVET THEREFOR.

1,254,747.   Specification of Letters Patent.   Patented Jan. 29, 1918.

Application filed September 6, 1917. Serial No. 189,986.

*To all whom it may concern:*

Be it known that I, FREDERICK WEHINGER, a citizen of the United States, residing at Waterbury, in the county of New Haven and State of Connecticut, have invented a new and useful Improvement in Wire Click-Springs and Fastening-Rivets Therefor; and I do hereby declare the following, when taken in connection with the accompanying drawings and the characters of reference marked thereon, to be a full, clear, and exact description of the same, and which said drawings constitute part of this application, and represent, in—

Figure 1:
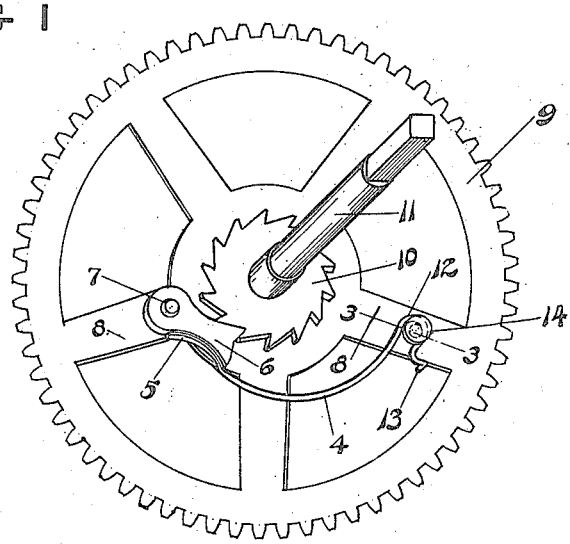

Figure 1 a perspective view showing my improvement applied to the main-wheel of a clock-movement.

Figure 2:
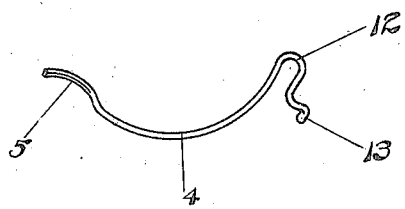

Fig. 2 a detached perspective view of the spring.

Figure 3:
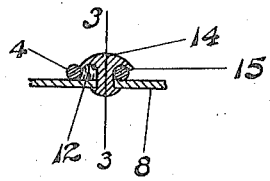

Fig. 3 a sectional view of the spring and fastening-rivet on the line 3—3 of Fig. 1.

My invention relates to an improved wire click-spring and fastening-rivet therefor, particularly designed for use in the manufacture of clocks, though available for use in other situations, the object being to provide at a low cost for material and labor, clocks and kindred structures with click-springs of superior efficiency and durability.

With these ends in view, my invention consists in a click-spring and fastening-rivet having certain details of construction as will be hereinafter described and pointed out in the claim.

In carrying out my invention as herein shown, I produce from a single piece of wire, a click-spring 4 the free end of which is flattened as at 5 to adapt it to bear, as shown in Fig. 1, upon the outer edge of an ordinary sheet-metal click 6 hung upon a stud 7 in one of the arms 8 of a main-wheel 9 mounted so as to turn upon the hub, not shown, of a ratchet-wheel 10 fastened upon the winding-arbor 11 of a clock, the click 6 being maintained in engagement with the ratchet 10 by the wire click-spring 4. The outer end of the said spring is bent upon itself to form a fastening-loop 12 the free end of which is bent inward at a right angle to the plane of the spring, to form a retaining-end 13 which, as shown in Fig. 1, is engaged with the edge of one of the arms 8 of the main-wheel 9.

For securing the spring in place upon the arm 8, I employ a fastening-rivet 14 formed with an undercut head 15 having a thin edge. As herein shown, the diameter of the head 15 of the rivet is somewhat smaller than the diameter of the loop 12 through which the shank of the rivet passes, it only being necessary that the said head shall be large enough to grip the wire at some point in the loop so as to hold the spring in place by the grip so obtained. The rivet 14 is mounted in the usual manner in one of the arms 8 of the wheel 9. It is only necessary that the undercut head of the rivet shall grip the spring at one point, as above stated, since such a grip is sufficient to firmly hold the wire from moving longitudinally or laterally with respect to the rivet. As the edge of the head 15 of the rivet is very thin, it yields sufficiently over that portion of the wire of the spring which forms the fastening-loop thereof, to provide for the emergence of the wire from under the said head on opposite sides of the point where the head grips the wire.

My improved wire click-spring and fastening-rivet are not, of course, limited to use in clock wheels, but are available for use in any part of a clock-movement where clicks are used, and may be applied to a plate, as well as to a wheel.

I claim:—

The combination with a wire click-spring adapted at its free end to be engaged with a click and formed at its opposite end with a fastening-loop the free end of which is bent at an angle to form a retaining-end; of a rivet passing through the said loop and having an undercut grooved head adapted to grip the loop for the purpose of holding the spring in place.

In testimony whereof, I have signed this specification in the presence of two subscribing witnesses.

FREDERICK WEHINGER.

Witnesses:
J. R. PUTNAM,
JOSEPH I. ROBERGE.

Copies of this patent may be obtained for five cents each, by addressing the "Commissioner of Patents, Washington, D. C."